Figure 1:
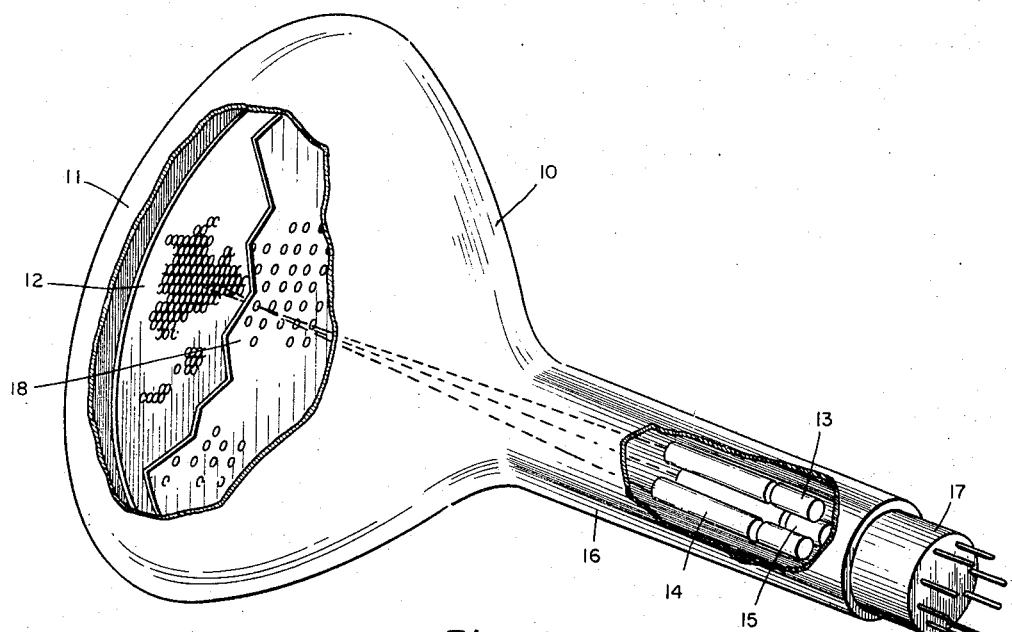

INVENTOR.
ALBERT K. LEVINE
FRANK C. PALILLA

BY

R. J. Frank
ATTORNEY

United States Patent Office 3,348,924
Patented Oct. 24, 1967

3,348,924
RECOVERING EXCESS VANADATE PHOSPHOR REMOVED FROM A CATHODOLUMINESCENT SCREEN
Albert K. Levine, Beechhurst, and Frank C. Palilla, Maspeth, N.Y., assignors to General Telephone and Electronics Laboratories, Inc., a corporation of Delaware
Original application May 28, 1964, Ser. No. 370,804, now Patent No. 3,243,625, dated Mar. 29, 1966. Divided and this application Mar. 25, 1966, Ser. No. 537,419
6 Claims. (Cl. 23—312)

This is a division of application Ser. No. 370,804 filed May 28, 1964, now Patent Number 3,243,625. This invention relates to cathodoluminescent screens and, in particular, to screens for use in color-television picture tubes.

Conventional television picture tubes employ a mosaic screen consisting of symmetrically placed dots or bars of blue, green and red-emitting phosphors. These phorphors are generally composed of silver-activated sulfide compounds, the blue-emitting phosphor component having a zinc sulfide base and the green-emitting component having a zinc-cadmium sulfide base. The red-emitting component is also composed of zinc-cadmium sulfide activated with silver but the cadmium sulfide content is higher than that of the green-emitting phosphor.

A requirement of all phosphor systems used in color television tubes is that they may be capable of faithfully reproducing a white surface. A "white" surface may be defined as one which can be described by the area surrounding illuminant C (C.I.E. coordinates $x=0.310$, $y=0.316$) on the Kelly chart reproduced in the JEDEC Electron Tube Council publication No. 16, Optical Characteristics of Cathode Ray Tube Screens. In order to reproduce such a surface, the light emitted by each of the phosphors when irradiated by its associated electron beam must bear a predetermined relationship to the light emitted by each of the other phosphors. One method of obtaining this relationship is to adjust the density of the electron beams exciting the phosphors so that the desired degree of brightness is provided by each component. Another method is to use electron beams having more nearly equal densities but to intentionally reduce the luminosity of the brighter phosphors to bring their light outputs closer to that of the least efficient components. In a screen composed of the sulfide phosphors described above, for example, the blue and green-emitting components radiate considerably more visible light under the same electron bombardment than does the red-emitting phosphor. Consequently, to obtain the desired white chromaticity the red-emitting phosphor is excited by a higher beam current than is used to excite the blue and green-emitting phosphors. In addition, the required chromaticity is further achieved by selecting or preparing the blue and green-emitting components in such a way that their brightness at a given beam current is less than the maximum which could otherwise be obtained. (The differences in operating intensities of the guns producing the electron beams are usually expressed in terms of gun current ratios. Ideally, if all electron guns were operating at the same beam intensities, the ratios would be equal to one.)

Although intentional reduction in the brightness of the phosphor leads to gun current ratios closer to unity, it also results in a reduction in the overall brightness of the screen. Further, the use of a higher beam current for one phosphor limits the life of the entire cathode ray tube since the electron gun used to excite that phosphor is more likely to fail while the other two guns are still functioning satisfactorily. Another important factor is that the color of the light emitted by the zinc-cadmium sulfide material employed as a red-emitting phosphor is actually somewhat orange to the eye and therefore limits the range of colors which can be derived in combiantion with the blue and green-emitting sulfide phosphors. In addition, the adjustment of the gun ratios required to achieve the desired white emission is somewhat complicated by the orange color of the zinc-cadmium sulfide phosphor. Accordingly, it is an object of our invention to provide a tri-color phosphor screen which provides greater brightness and improved color balance than known tri-color screens. More specifically, it is an object of our invention to provide a tri-color screen which employs phosphors having the greatest possible light output consistent with good color rendition while at the same time maintaining the beam current ratios at less than 2.0.

There are other disadvantages inherent in cathode ray tubes employing screens composed entirely of sulfide phosphors. When these tubes are viewed in a lighted room, the light reflected from the screen is no longer white because of the selective and nonuniform reflectivity of the phosphor and hence tends to distort the colors in the picture being viewed. This distortion is due primarily to the red-emitting zinc-cadmium sulfide phosphor which has a yellow-orange body color. It is therefore another object of our invention to minimize color distortion by providing a screen in which the phosphors have an essentially white body color.

The yellow-orange body color of the zinc-cadmium sulfide red-emitting phosphor also introduces certain dfficulties in applying the phosphor to the face of the tube by the conventional photobinder process. In this process, the phosphor powder is combined with a photosensitive resin, such as polyvinyl alcohol, and the resin then polymerized by exposure to ultraviolet radiation through small holes in a mask. In those areas where the ultraviolet radiation does not strike the photosensitive resin, the resin may be subsequently washed off by a suitable solvent leaving an array of phosphor dots incorporated in the photosensitive material. However, in applying the red-emitting sulfide phosphor by this process long exposure times (or, in some cases, more than one exposure) are required because the dark body color inhibits the transmission of the ultraviolet radiation through the phosphor. This requirement for a prolonged exposure (or double exposure) leads to several difficulties including increased possibility of screen contamination, non-uniformities in the screen caused by scattering of light to adjacent phosphor dots which had been previously deposited and an increase in the cost of manufacturing the tube. Thus, it is a further object of this invention to provide a tri-color phosphor screen which is simpler and less expensive to manufacture than screens using sulfide phosphors exclusively. Also, it has been found that the color of the light emitted by the red-emitting zinc-cadmium sulfide phosphor tends to shift during tube processing and it is desired therefore to provide a screen composed of phosphors which remain stable during fabrication of the tube.

Another disadvantage inherent in screens composed entirely of sulfide phosphors is their inability to "track" properly as the beam currents vary. That is, when the brightness of the picture is changed by adjustment of the beam currents, the colors in the screen also change. This color shift with beam current is primarily due to the change in the spectral emission of the red-emitting sulfide phosphor with variation in beam current intensity. Consequently it is yet another object of the invention to provide a tri-color screen in which the color shift with changes in beam current is minimized.

In accordance with the present invention, we have provided a cathodoluminescent screen for use in color cathode ray tubes in which phosphor dots are arranged in a predetermined pattern on a substrate consisting of the faceplate of a cathode ray tube. At least one of the phosphor dot components is composed of a host crystal of a vanadate of a trivalent metal activated with a type 4f trivalent rare-earth element. More specifically, we have invented a tri-color screen which, in combination with blue and green-emitting sulfide phosphors, employs a red-emitting phosphor composition comprising a host crystal of at least one trivalent metal selected from the group consisting of yttrium, gadolinium and lutetium activated with a trivalent rare earth element selected from the group consisting of europium and samarium.

Figure 2:
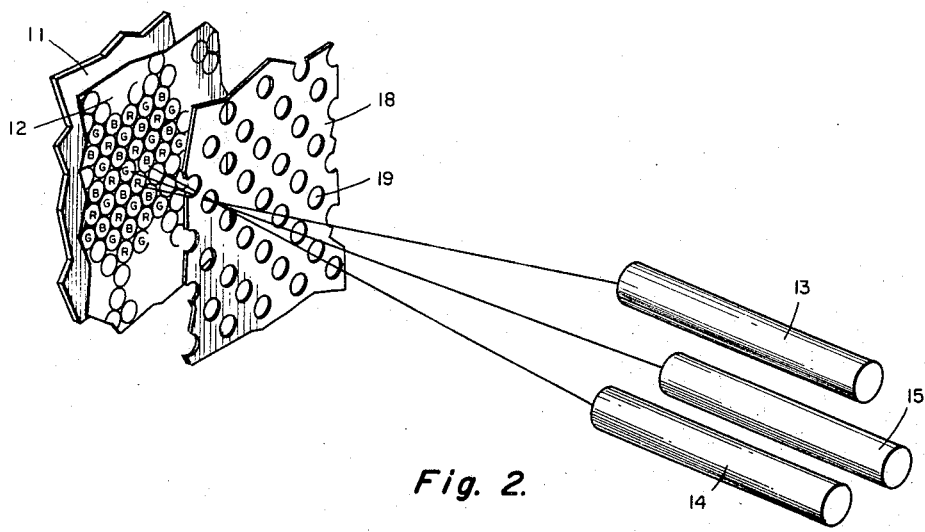

The above objects of and the brief introduction to the present invention will be more fully understood and further objects and advantages will become apparent from a study of the following description in connection with the drawing, wherein:

FIG. 1 is a perspective cutaway view of a typical color television picture tube, and FIG. 2 is an enlarged section of FIG. 1 showing details of the phosphor screen.

Referring to FIG. 1, there is shown a tri-color cathode ray tube comprising an evacuated envelope 10 having a glass faceplate 11 at one end. A phosphor screen 12, consisting of a large number of electron-responsive phosphor dots or elements is affixed to the internal surface of the faceplate 11. One third of these dots emit red light when irradiated by an electron beam, one third emit blue light, and one third emit green light. The dots are uniformly deposited on the faceplate 11 in clusters of three, each cluster consisting of one red-emitting dot R, one blue-emitting dot B, and one green-emitting dot G.

Three electron guns 13, 14, and 15 are located in the neck 16 of the tube which is sealed by a tube socket 17 having pins for connection to the receiver circuitry. A mask 18 is located between the phosphor screen 12 and the electron guns 13-15 but is spaced a relatively short distance from the screen. The mask is provided with a plurality of apertures 19, one of these apertures being located approximately over the center of each cluster of phosphor dots.

The beams from the electron guns 13-15 converge at the mask 18 and then diverge as they pass through the aperture 19. This divergence is sufficient to cause the electron beam from gun 13 to strike only the red-emitting phosphor dots R, the beam from gun 14 only the blue-emitting phosphor dots B and the beam from gun 15 only the green-emitting phosphor dots G. By controlling the beam currents emitted by the three guns 13 to 15, a wide range of colors (including white) can be obtained from screen 12.

As previously discussed, the red-emitting phosphor dots in screen 12 may consist of yttrium vanadate, gadolinium vanadate and/or lutetium vanadate activated by europium and/or samarium. The activator in these compositions replaces the host cation to the extent required to maintain stoichiometry. The blue-emitting component may be any suitable phosphor material such as, for example, silver-activated zinc sulfide and the green-emitting component may consist of silver activated zinc-cadmium sulfide. Alternatively, the green-emitting component may consist of zinc silicate activated with between 0.08 and 1.5 mole percent manganese.

In particular, we have found that a phosphor screen composed of a red-emitting component consisting of europium activated yttrium vanadate $(Y_{1-x}Eu_x)VO_4$, where $x$ represents the mole fraction of europium substituted for yttrium; a blue-emitting component consisting of silver activated zinc sulfide (ZnS:Ag); and a green-emitting component consisting of silver activated zinc-cadmium sulfide (Zn, CdS:Ag) has the desired properties.

The amount of europium used to activate the yttrium vanadate is between 1 and 10 mole percent; i.e. $x$ in the formula $(Y_{1-x}Eu_x)VO_4$ is between 0.01 and 0.1. The zinc sulfide may be self activated or activated with up to 0.05 mole percent silver and the zinc-cadmium sulfide may be activated with between 0.0001 and 0.05 mole percent silver. The mole ratio of zinc sulfide to cadmium sulfide in the zinc-cadmium sulfide phosphor is in the range 3.0:1 to 2.2:1. The body colors of the red-emitting europium-activated yttrium vanadate and the blue-emitting silver-activated zinc sulfide are white and the body color of the green-emitting silver activated zinc-cadmium sulfide is a yellowish white.

A tri-color phosphor screen was made by the "dusting" process in which a layer of photosensitive polyvinyl alcohol was spread over the faceplate 11 of a cathode ray tube. Yttrium vanadate powder activated with 5 mole percent europium having an average particle size of 8 microns was dusted over the photosensitive layer.

The layer was then exposed to ultraviolet radiation through precisely located openings in a mask for a period of about 4 minutes after which the unexposed polyvinyl alcohol and phosphor powder were washed off with deionized water leaving an array of europium-activated yttrium vanadate red-emitting phosphor dots incorporated in the light-fixed polyvinyl alcohol layer affixed to the faceplate.

This process was then repeated except that blue-emitting zinc-sulfide powder activated with about 0.01 mole percent silver and having an average particle size of about 8 microns was dusted on the polyvinyl alcohol layer instead of the europium activated yttrium vanadate. The exposure time of the zinc-sulfide phosphor to ultraviolet radiation was approximately 4 minutes.

Finally the process was again repeated except that this time green-emitting silver activated zinc-cadmium sulfide phosphor dots were deposited on the face. The mole ratio of zinc sulfide to cadmium sulfide in the phosphor was about 2.64:1 and the mole percent silver activation approximately .01. The average particle size of the zinc-cadmium sulfide phosphor was about 8 microns and the exposure time for fixing the polyvinyl alcohol approximately 4 minutes. The order in which the phosphors are deposited on the faceplate is not critical; the order red, blue, and green-emitting phosphors described being by way of example only.

The screen was then baked for 20 to 30 minutes to decompose and drive off the volatile ingredients leaving the phosphor dots on the faceplate in the desired pattern. Further details of this process are given in U.S. Patent 3,025,161 granted to T. V. Rychlewski on March 13, 1962, and assigned to Sylvania Electric Products Inc.

Because of the white body color of the yttrium vanadate host, the time required for fixing the polyvinyl alcohol is considerably less than the average period of 12–14 minutes required when red-emitting silver-activated zinc-cadmium sulfide having a yellowish-orange body color is employed. Also, it is not necessary to pre-coat with and partially polymerize the polyvinyl alcohol in those areas where the red-emitting phosphor dots are to be deposited, as is often the case when the darker zinc-cadmium sulfide phosphor is used. As a result, there is a substantial overall reduction in the time required to prepare the tube and an improvement in the quality of the final screen.

A number of 21-inch diameter, 70 degree, 25,000 volts cathode ray tubes containing screens prepared from a red-emitting yttrium vanadate phosphor and blue and green-emitting sulfide phosphors were tested at the same beam currents. Their brightness was then compared with that obtained from similar commercially available tubes containing screens employing only sulfide phosphors. The relative brightnesses measured when the three phosphors were excited individually and then together to form white are given in Table I together with the beam current ratios required to approximate the chromaticity of a black body at 9300° K. (white). As evident from the chromaticity coordinates, the light emitted by the europium activated yttrium vanadate is a deeper red than that obtained from the silver activated zinc-cadmium sulfide. Consequently, the triangle formed by the three phosphors of this invention encompasses a wider range of colors than can be obtained with the all-sulfide screen.

TABLE I

| Field Color | Total Beam Current in Microamperes | Vanadate-Sulfide Tube | | | | All-Sulfide Tube | | | |
|---|---|---|---|---|---|---|---|---|---|
| | | Brightness in Foot Lamberts | Chromaticity Coordinates | | Beam Current Ratio for 9,300° K. (white) | Brightness in Foot Lamberts | Chromaticity Coordinates | | Beam Current Ratio for 9,300° K. (white) |
| | | | x | y | | | x | y | |
| Red | 500 | 7.7 | 0.645 | 0.326 | | 6.3 | 0.627 | 0.354 | |
| Blue | 500 | 6.7 | 0.157 | 0.046 | | 3.9 | 0.157 | 0.046 | |
| Green | 500 | 35.2 | 0.256 | 0.585 | | 30.9 | 0.256 | 0.585 | |
| White (9,300° K.) | 800 | 28.1 | | | | 22.0 | | | |
| Beam Ratios: | | | | | | | | | |
| Red/blue | 800 | | | | 1.82 | | | | 1.58 |
| Do | 800 | | | | 1.14 | | | | 1.38 |

The all-sulfide tubes listed in Table I employed blue and green-emitting phosphors which had been deliberately reduced in efficiency and luminous output by the addition of about 0.5 part per million of cobalt. This was necessary to bring the red to green and red to blue electron beam current ratios within commercially acceptable limits (less than 2.0). In the case of the tubes employing the red-emitting vanadate base phosphor, the blue and green-emitting sulfide phosphors were not treated or synthesized in such a way as to reduce their efficiency. Nevertheless, the beam current ratios necessary to produce 9300° K. white are less than 2.0 and the brightness of the white field is considerably higher than with the all-sulfide tube. [If desired, the red-to-blue beam current ratio for our tube can be decreased to 1.58 or less by reducing the brightness of the blue-emitting phosphor. Since the extent of the deadening is less than required for the all-sulfide screen, the overall brightness is still greater than that of the all-sulfide tube.]

When the beam currents were varied simultaneously in magnitude to produce a white field of changing brightness, the color of the light emitted from the screen employing the vanadate base phosphor remained constant. However, in the case of the all-sulfide base screen, there was a perceptible shift in color as the beam current was varied over the same range.

The comparison between the two screens was especially noticeable when the red fields only were observed. It was found that the red light emitted by our screen was brighter and deeper red at all beam currents than the all-sulfide screen. Also this emission color remained constant with changes in beam current whereas the color of the light emitted by the all-sulfide screen shifted toward green with increasing beam current.

In the all-sulfide screen there is appreciable desaturation of the blue field due to the photo-excitation of the surrounding red-emitting zinc-cadmium sulfide phosphor elements. This results because a portion of the radiation emitted by the blue-emitting phosphor impinges on the red-emitting sulfide material causing it to emit red light with a consequent impairment of the fidelity of the blue field. In screens employing red-emitting vanadate base phosphors there is no substantial photo-excitation of the red-emitting phosphor because the blue and green-emitting phosphors have no substantial emission within the predominant excitation band of the red-emitting vanadate phosphor.

Using the "dusting" process of applying the phosphor, the useful particle size range is between 2.0 and 20.0 microns as measured by a Fischer Sub-Sieve Sizer. The optimum range of particle size was found to be 5 to 10 microns for the red-emitting europium activated yttrium vanadate, 7 to 12 microns for the blue-emitting silver activated zinc sulfide, and 7 to 12 microns for the green-emitting silver activated zinc-cadmium sulfide. The slurry process which is described in detail by S. Levy and A. K. Levine in a paper, "The Preparation of Phosphor Screens for Color Television Tubes," Journal of Electrochemical Society, vol. 101, No. 2, February 1954, may also be used but the optimum particle size range for all three phosphors is between 0.5 and 7.0 microns.

The europium activated yttrium vanadate phosphor material is somewhat more expensive, at present, than the red-emitting sulfide material. However, this is offset to a large extent by the ease with which the phosphor not actually deposited on the screen during the manufacturing process can be recovered. In order to recover this phosphor for subsequent use, the solid portion is first separated by settling, filtration or other suitable method and then baked at 450° C. for one hour to remove all the organic photoresist material used in preparing the screen. Next, any sulfides present are dissolved with a hot dilute mineral acid (such as hydrochloric or nitric acid) in order to free the europium activated yttrium vanadate of these inorganic contaminants. Finally, the recovered phosphor is dried at 120° C. and passed through a 325 mesh sieve. It has been found that this procedure results in almost complete recovery of the phosphor and that the recovered material has essentially the same luminescent properties as the original composition.

The tri-color phosphor screen described herein can also be prepared using samarium as the activator for yttrium vanadate instead of europium. Alternatively, gadolinium vanadate ($GdVO_4$) and lutetium vanadate ($LuVO_4$) activated with either europium or samarium can be employed in combination with the blue-emitting zinc sulfide and green-emitting zinc-cadmium sulfide phosphors. However, samarium activated yttrium vanadate does not produce as bright a red emission as the europium activated material although it does produce a screen suitable for many purposes.

These materials were tested in a demountable 15 kv. cathode ray assembly having a 5-inch raster at beam currents between 25 and 100 microamperes. Relative brightness units as compared with europium activated yttrium vanadate are given in Table II together with the percent of the total light emitted which passed through a red filter transmitting radiation having wavelengths longer than 5800 Angstroms. All materials contained 5 mole percent of the activator except for the samarium activated yttrium vanadate in which samarium was present to the extent of 0.5 mole percent.

TABLE II

| Phosphor | Relative Brightness | Percent Red |
|---|---|---|
| $(Y_{.95}Eu_{.05})VO_4$ | 100 | 75 |
| $(Gd_{.95}Eu_{.05})VO_4$ | 80 | 65 |
| $(Lu_{.95}Eu_{.05})VO_4$ | 70 | 75 |
| $(Y_{.995}Sm_{.005})VO_4$ | 40 | 52 |

What is claimed is:

1. In the manufacture of a cathode ray tube having a phosphor screen employing a red-emitting phosphor comprising a host crystal of a vanadate of a trivalent metal selected from the group consisting of yttrium, gadolinium and lutetium activated by a trivalent rare earth element selected from the group consisting of europium and samarium, a blue-emitting phosphor comprising silver activated zinc sulfide, and a green-emitting phosphor comprising silver activated zinc-cadmium sulfide, said red, blue and green-emitting phosphors being mixed with polyvinyl alcohol, the method of recovering said red-emitting phosphor from said blue and green-emitting sulfide phosphors comprising the steps of:
   (a) removing excess red, blue, and green phosphors and polyvinyl alcohol from the screen to form a mixture,
   (b) separating the solid portion of said mixture of phosphor and polyvinyl alcohol from the rest of said mixture,
   (c) heating said solid portion to approximately 450° C. for about one hour until substantially all of said polyvinyl alcohol is removed,
   (d) treating the remaining mixture with a hot dilute mineral acid thereby selectively dissolving said blue-emitting and green-emitting phosphors while being substantially non-reactive with said red-emitting phosphor, and
   (e) drying the recovered red-emitting phosphor, said recovered red-emitting phosphor having essentially the same luminescent properties as the original composition.

2. The method of recovering a red-emitting vanadate phosphor from blue and green-emitting sulfide phosphors as defined by claim 1 wherein said hot dilute mineral acid is selected from the group consisting of hydrochloric and nitric acids.

3. The method of recovering a red-emitting vanadate phosphor from blue and green-emitting sulfide phosphors as defined by claim 1 wherein said recovered red-emitting phosphor is dried at a temperature of about 120° C.

4. In the manufacture of a cathode ray tube having a phosphor screen employing a red-emitting phosphor comprising a vanadate of a trivalent metal selected from the group consisting of yttrium, gadolinium and lutetium activated by a trivalent rare earth element selected from the group consisting of europium and samarium, and at least one color-emitting sulfide phosphor, said red and color-emitting sulfide phosphors being mixed with an organic photoresist material, the method of recovering said red-emitting phosphor from said color-emitting sulfide phosphor comprising the steps of:
   (a) removing excess red and color-emitting sulfide phosphors and organic photoresist material from the screen to form a mixture,
   (b) separating the solid portion of said mixture of phosphors and organic photoresist material from the rest of said mixture,
   (c) heating said solid portion to approximately 450° C. for about one hour until substantially all of said organic photoresist material is removed,
   (d) treating the remaining mixture with a hot dilute mineral acid thereby selectively dissolving said color-emitting sulfide phosphor while being substantially non-reactive with said red-emitting phosphor, and
   (e) drying the recovered red-emitting phosphor, said recovered red-emitting phosphor having essentially the same luminescent properties as the original composition.

5. The method of claim 4 wherein said hot dilute mineral acid is selected from the group consisting of hydrochloric and nitric acids.

6. The method of claim 4 wherein said recovered red-emitting phosphor is dried at a temperature of about 120° C.

References Cited

FOREIGN PATENTS 248,003  5/1963  Australia.
610,657  12/1960  Canada.

OTHER REFERENCES

Lind, R.C.A. Technical Notes, R.C.A.T.N. #155, Princeton, N.J., 1958.

NORMAN YUDKOFF, *Primary Examiner.*

S. EMERY, *Assistant Examiner.*